(12) United States Patent
Suzuki et al.

(10) Patent No.: US 10,836,937 B2
(45) Date of Patent: Nov. 17, 2020

(54) PRESSURE-SENSITIVE ADHESIVE COMPOSITION

(71) Applicant: NITTO DENKO CORPORATION, Ibaraki (JP)

(72) Inventors: Tatsuya Suzuki, Ibaraki (JP); Katsuhiko Kamiya, Ibaraki (JP); Kiyoe Shigetomi, Ibaraki (JP); Shinji Hoshino, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 134 days.

(21) Appl. No.: 15/181,517

(22) Filed: Jun. 14, 2016

(65) Prior Publication Data

US 2016/0369136 A1    Dec. 22, 2016

(30) Foreign Application Priority Data

Jun. 16, 2015    (JP) .................................. 2015-121508
May 13, 2016    (JP) .................................. 2016-096684

(51) Int. Cl.
*C09J 7/38*      (2018.01)
*C09J 133/08*    (2006.01)
*C09J 7/20*      (2018.01)
*C09J 133/06*    (2006.01)

(52) U.S. Cl.
CPC .................. *C09J 7/385* (2018.01); *C09J 7/20* (2018.01); *C09J 133/066* (2013.01); *C09J 133/08* (2013.01); *C09J 2433/00* (2013.01)

(58) Field of Classification Search
None
See application file for complete search history.

(56) References Cited

U.S. PATENT DOCUMENTS

| | | | | |
|---|---|---|---|---|
| 5,359,021 | A | * | 10/1994 | Weinschenk, III ....... A61F 2/16 526/264 |
| 5,814,685 | A | * | 9/1998 | Satake ................. C09D 11/326 347/100 |
| 6,274,671 | B1 | * | 8/2001 | Kageishi ............ C09D 133/068 525/100 |

(Continued)

FOREIGN PATENT DOCUMENTS

CN    102834262 A    12/2012
CN    103249791 A    8/2013

(Continued)

OTHER PUBLICATIONS

Aldrich Data Sheet (2018).*

(Continued)

*Primary Examiner* — Frank D Ducheneaux
(74) *Attorney, Agent, or Firm* — Sughrue Mion, PLLC (57) ABSTRACT

Provided is a PSA composition for forming a PSA comprising a (meth)acrylic polymer, comprising, as monomeric components constituting the (meth)acrylic polymer: (A) a $C_{2-18}$ alkyl (meth)acrylate, (B) an alicyclic monomer, and (C) a monomer having at least either a hydroxyl group or a carboxyl group. The average number of carbons of alkyl group in the (A) is 8 or less. The monomeric components comprise the (C) at 3% by weight or greater while the weights Wb and Wc of the (B) and (C) satisfy a relationship $0.8 \leq Wb/Wc$.

15 Claims, 1 Drawing Sheet

(56) References Cited

U.S. PATENT DOCUMENTS

| | | | |
|---|---|---|---|
| 6,995,193 B1* | 2/2006 | Fukui | B32B 7/12 427/207.1 |
| 7,070,051 B2* | 7/2006 | Kanner | A61B 17/06133 206/382 |
| 7,863,182 B2* | 1/2011 | Matsumura | C09J 7/02 438/628 |
| 2012/0214936 A1* | 8/2012 | Fujita | C09J 133/04 524/548 |
| 2012/0328891 A1 | 12/2012 | Suwa et al. | |
| 2013/0005909 A1* | 1/2013 | Natsui | C09J 7/10 525/205 |
| 2013/0034737 A1 | 2/2013 | Imoto et al. | |
| 2014/0044961 A1 | 2/2014 | Takami et al. | |
| 2014/0272201 A1* | 9/2014 | Takeda | C09J 133/066 428/1.54 |
| 2014/0342121 A1 | 11/2014 | Taguchi et al. | |
| 2014/0367040 A1* | 12/2014 | Traser | C09J 133/10 156/332 |
| 2016/0014894 A1 | 1/2016 | Endo et al. | |
| 2016/0017187 A1* | 1/2016 | Lipscomb | B05D 1/42 526/318.4 |
| 2016/0145473 A1 | 5/2016 | Yoon et al. | |

FOREIGN PATENT DOCUMENTS

| | | | |
|---|---|---|---|
| CN | 104250539 A | 12/2014 | |
| EP | 2 559 552 A1 | 2/2013 | |
| EP | 2 818 486 A1 | 12/2014 | |
| JP | 2007-91773 A | 4/2007 | |
| JP | 2013-522393 A | 6/2013 | |
| JP | 2014-34655 A | 2/2014 | |
| JP | 2015-10185 A | 1/2015 | |
| WO | 2012/077613 A1 | 6/2012 | |
| WO | 2013/081145 A1 | 6/2013 | |
| WO | 2014/092186 A1 | 6/2014 | |
| WO | 2014/157290 A1 | 10/2014 | |
| WO | 2014/181853 A1 | 11/2014 | |
| WO | 2014/209074 A1 | 12/2014 | |

OTHER PUBLICATIONS

Extended European Search Report dated Jul. 18, 2016, from the European Patent Office in counterpart European application No. 16172673.2.
Communication dated Oct. 9, 2018 from the European Patent Office in counterpart Application No. 16 172 673.2.
First Office Action dated Oct. 31, 2019, from the China National Intellectual Property Administration in counterpart Application No. 201610431011.4.
Communication dated Jan. 7, 2020, issued by the Brazilian Patent Office in application No. BR102016014091-9.
Notice of Reasons for Refusal dated Jan. 23, 2020 from Japanese Patent Office in JP Application No. 2016-096684.
Summons to attend oral proceedings pursuant to Rule 115(1) EPC dated Mar. 25, 2020 in counterpart European application No. 16172673.2.
The Second Office Action dated Jul. 17, 2020 by the State Intellectual Property Office of People's Republic of China in Chinese Application No. 201610431011.4.

* cited by examiner

PRESSURE-SENSITIVE ADHESIVE COMPOSITION

CROSS-REFERENCE

The present application claims priority based on Japanese Patent Application No. 2015-121508 filed on Jun. 16, 2015, and Japanese Patent Application No. 2016-096684 filed on May 13, 2016, and the entire contents of these applications are incorporated herein by reference.

BACKGROUND OF THE INVENTION

1. Field of the Invention

The present invention relates to a pressure-sensitive adhesive composition. In particular, the present invention relates to a pressure-sensitive adhesive composition capable of forming a pressure-sensitive adhesive less susceptible to reduction of transparency caused by oil.

2. Description of the Related Art

In general, pressure-sensitive adhesive (PSA) exists as a soft solid (a viscoelastic material) in a room temperature range and has a property to adhere easily to an adherend with some pressure applied. For such a property, PSA has been widely used in various industrial fields from home appliances to automobiles, OA equipment, and so on.

PSA can be used in applications involving direct contact with oil. It is preferable that PSA used in such applications has properties that are not easily affected by oil (oil resistance). Oil resistance can be evaluated from various aspects. For instance, regarding one aspect of oil resistance, Japanese Patent Application Publication No. 2014-34655 (Patent Document 1) discloses a PSA having a low rate of sebum swelling.

SUMMARY OF THE INVENTION

The art described in Patent Document 1 is aimed to provide a PSA capable of forming a highly transparent PSA layer with a low rate of sebum swelling (see Paragraph [0006]). Although Patent Document 1 discusses the initial transparency of the PSA, it may change upon contact with sebum. An objective of the present invention is thus to provide a PSA composition capable of forming a PSA less susceptible to reduction of transparency caused by oil (e.g. clouding), which is another aspect of oil resistance. Another related objective is to provide a PSA layer obtainable from the PSA composition and a PSA sheet comprising the PSA layer.

The present invention provides a PSA composition for forming a PSA comprising a (meth)acrylic polymer. The PSA composition comprises the following monomeric components constituting the (meth)acrylic polymer: (A) an alkyl (meth)acrylate having an alkyl group with 2 to 18 carbons at an ester end (or "component (A)" hereinafter), (B) an alicyclic monomer (or "component (B)" hereinafter), and (C) a monomer having at least either a hydroxyl group or a carboxyl group (or "component (C)" hereinafter). Herein, the average number of carbons of the alkyl group in the component (A) is 8 or less. The monomeric components preferably comprise at least 3% component (C) by weight. The components (B) and (C) among the monomeric components have weights Wb and Wc, respectively, preferably satisfying a relationship $0.8 \leq Wb/Wc$. Such a PSA composition can provide a PSA less susceptible to oil-caused reduction of transparency.

The component (A) preferably comprises an alkyl (meth)acrylate having an alkyl group with up to 5 carbons at the ester end. With such a PSA composition, a PSA less susceptible to oil-caused reduction of transparency can be preferably obtained.

The art disclosed herein can be preferably implemented in an embodiment where the average number of carbons of the alkyl group in the component (A) is less than 8. With such a PSA composition, a PSA less susceptible to oil-caused reduction of transparency can be preferably obtained.

In the monomeric components, the combined components (B) and (C) content is preferably 15 to 85% by weight. Such a PSA composition may provide a PSA that combines a property to resist oil to minimize the reduction of transparency and other properties (adhesiveness, cohesiveness, low temperature characteristics, etc.) at a higher level.

In a preferable embodiment of the art disclosed herein, Wb and Wc satisfy a relationship $1 \leq Wb/Wc \leq 5$. With such a PSA composition, a PSA yet less susceptible to oil-caused reduction of transparency can be preferably obtained.

The component (C) preferably comprises a monomer having a hydroxyl group. Such a PSA composition may provide a PSA that combines a property to resist oil to minimize the reduction of transparency and other properties (initial transparency, low temperature characteristics, etc.) at a higher level.

In the art disclosed herein, a copolymer corresponding to the composition of the monomeric components preferably has a glass transition temperature (Tg) higher than −45° C., but no higher than −20° C. Such a PSA composition may provide a PSA combining a property to resist oil to minimize the reduction of transparency and other properties (adhesiveness, cohesiveness, low temperature characteristics, etc.) at a higher level.

The art disclosed herein can be preferably implemented in an embodiment where the Tg value of the copolymer corresponding to the composition of the monomeric components is higher by 8° C. or more than the Tg value of a copolymer corresponding to the composition of the monomeric components excluding the component (B). With such a PSA composition, a PSA yet less susceptible to oil-caused reduction of transparency can be preferably obtained.

This description provides a PSA layer obtainable from a PSA composition disclosed herein.

This description further provides a PSA sheet having the PSA layer at least on one face of a support.

DETAILED DESCRIPTION OF THE INVENTION

Preferred embodiments of the present invention are described below. Matters necessary to practice this invention other than those specifically referred to in this description may be understood as design matters based on the conventional art in the pertinent field for a person of ordinary skill in the art. The present invention can be practiced based on the contents disclosed in this description and common technical knowledge in the subject field.

As used herein, the term "PSA" refers to, as described earlier, a material that exists as a soft solid (a viscoelastic material) in a room temperature range and has a property to adhere easily to an adherend with some pressure applied. As defined in "Adhesion: Fundamental and Practice" by C. A. Dahlquist (McLaren & Sons (1966), P. 143), PSA referred to herein is a material that has a property satisfying complex tensile modulus E* (1 Hz)<$10^7$ dyne/cm$^2$ (typically, a material that exhibits the described characteristics at 25° C.).

As used herein, the term "(meth)acrylate" comprehensively refers to acrylate and methacrylate. Similarly, the term "(meth)acryloyl" comprehensively refers to acryloyl and methacryloyl while the term "(meth)acryl" comprehensively refers to acryl and methacryl.

As used herein, the term "monomeric components constituting a (meth)acrylic polymer" refers to monomeric units that constitute the (meth)acrylic polymer in a PSA obtained from the PSA composition. The PSA composition may comprise the monomeric components as unreacted monomers (starting monomers whose polymerizable functional groups are unreacted), as a polymerized product, or as a mixture of these.

In this description, the PSA's low susceptibility to oil-caused reduction of transparency (e.g. low susceptibility to clouding of the PSA upon contact with oil) may be referred to as oil-caused clouding resistance. The clouding is not limited to a certain color such as white. The oil herein can be in a liquid state or in a solid state at ambient temperature. In other words, the concept of "oil" encompasses a fat.

As used herein, the term "active energy ray" refers to an energy ray having energy capable of causing a chemical reaction such as polymerization, crosslinking, initiator decomposition, etc. Examples of the active energy ray herein include lights such as ultraviolet (UV) rays, visible lights, infrared lights, radioactive rays such as α rays, β rays, γ rays, electron beam, neutron radiation, X rays, etc.

<Monomeric Components>

The PSA composition disclosed herein comprises, as monomeric components constituting the (meth)acrylic polymer, a component (A), a component (B) and a component (C) described below.

The component (A) is an alkyl (meth)acrylate having an alkyl group with 2 to 18 carbons at the ester end. Hereinafter, an alkyl (meth)acrylate having an alkyl group with a number of carbons ranging from X up to Y at the ester end may be represented by "$C_{X-Y}$ alkyl (meth)acrylate." The structure of $C_{2-18}$ alkyl group in the $C_{2-18}$ alkyl (meth)acrylate is not particularly limited. The alkyl group can be either a straight chain or a branched chain. For the component (A), these $C_{2-18}$ alkyl (meth)acrylates can be used singly as one species or in combination of two or more species.

Examples of a $C_{2-18}$ alkyl (meth)acrylate having a straight-chain alkyl group at the ester end include ethyl (meth)acrylate, n-propyl (meth)acrylate, n-butyl (meth)acrylate, n-pentyl (meth)acrylate, n-hexyl (meth)acrylate, n-heptyl (meth)acrylate, n-octyl (meth)acrylate, n-nonyl (meth)acrylate, n-decyl (meth)acrylate, n-undecyl (meth)acrylate, n-dodecyl (meth)acrylate, n-tridecyl (meth)acrylate, n-tetradecyl (meth)acrylate, n-pentadecyl (meth)acrylate, n-hexadecyl (meth)acrylate, n-heptadecyl (meth)acrylate, and n-octadecyl (meth)acrylate. Examples of a $C_{2-18}$ alkyl (meth)acrylate having a branched alkyl group at the ester end include isopropyl (meth)acrylate, tert-butyl (meth)acrylate, isobutyl (meth)acrylate, isopentyl (meth)acrylate, tert-pentyl (meth)acrylate, neopentyl (meth)acrylate, isohexyl (meth)acrylate, isoheptyl (meth)acrylate, 2-ethylhexyl (meth)acrylate, isooctyl (meth)acrylate, isononyl (meth)acrylate, isodecyl (meth)acrylate, 2-propylheptyl (meth)acrylate, isoundecyl (meth)acrylate, isododecyl (meth)acrylate, isotridecyl (meth)acrylate, isomyristyl (meth)acrylate, isopentadecyl (meth)acrylate, isohexadecyl (meth)acrylate, isoheptadecyl (meth)acrylate, and isostearyl (meth)acrylate.

The art disclosed herein can be preferably implemented in an embodiment where the component (A) comprises one, two or more species selected from $C_{4-9}$ alkyl acrylates. Preferable examples of $C_{4-9}$ alkyl acrylates include n-butyl acrylate, 2-ethylhexyl acrylate, isooctyl acrylate and isononyl acrylate.

In the art disclosed herein, the component (A) is selected such that the alkyl group has an average number of carbons of 8 or less. When the component (A) comprises two or more species of $C_{2-18}$ alkyl (meth)acrylate, the average number of carbons of the alkyl group is determined as a sum of products of the numbers of carbons of the alkyl groups at the ester end in the respective $C_{2-18}$ alkyl (meth)acrylates times the corresponding weight fractions of the respective $C_{2-18}$ alkyl (meth)acrylates relative to the entire component (A). For instance, with respect to a component (A) formed of 25 parts by weight of n-butyl acrylate and 15 parts by weight of 2-ethylhexyl acrylate as in Sample 2 described later in the worked examples, the average number of carbons of the alkyl group is calculated to be 4(25/40)+8(15/40)=5.5. When the component (A) consists of one species of $C_{2-18}$ alkyl (meth)acrylate, the number of carbons of the alkyl group in the $C_{2-18}$ alkyl (meth)acrylate is the average number of carbons of the alkyl group in the component (A).

With the component (A) having an alkyl group with an average 8 or less carbons, in combination with the component (B) and component (C), a PSA can be obtained with great oil-caused clouding resistance. From the standpoint of obtaining greater oil-caused clouding resistance, the average number of carbons of the alkyl group is preferably less than 8, more preferably less than 7, or yet more preferably less than 6. The lower limit of average number of carbons of the alkyl group is not particularly limited. From the standpoint of providing a PSA having oil-caused clouding resistance and other properties (adhesiveness, cohesiveness, low temperature characteristics, etc.) in a preferable balance, the average number of carbons of the alkyl group is usually suitably 3 or greater, or preferably 3.5 or greater (e.g. 3.8 or greater).

The component (A) preferably comprises a $C_{2-5}$ alkyl (meth)acrylate. By this means, the average number of carbons of the alkyl group in the component (A) can be suitably adjusted to be in the preferable range. Hence, a PSA composition comprising a $C_{2-5}$ alkyl (meth)acrylate as the component (A) can form a PSA having great oil-caused clouding resistance. It is more preferable that the component (A) comprises a $C_{3-4}$ alkyl (meth)acrylate.

The component (B) is an alicyclic monomer. As the alicyclic monomer, any monomer having an alicyclic structure-containing group as well as an unsaturated double bond-containing polymerizable functional group such as a (meth)acryloyl group or a vinyl group may be used without limitations. For the component (B), these alicyclic monomers can be used singly as one species or in combination of two or more species. As used herein, the term "alicyclic structure-containing group" refers to a moiety having at least one alicyclic structure. The term "alicyclic structure" refers to a carbocyclic ring structure which may be saturated or unsaturated, but may not be aromatic. In this description, the alicyclic structure-containing group may be simply referred to as "alicyclic group." Preferable examples of the alicyclic group include a hydrocarbon group and a hydrocarbon-oxy group having an alicyclic structure, respectively.

In the art disclosed herein, preferable alicyclic monomers include an alicyclic (meth)acrylate having an alicyclic group and a (meth)acryloyl group. Specific examples of alicyclic (meth)acrylates include cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, isobornyl (meth)acrylate, and dicyclopentanyl (meth)acrylate as well as HPMPA, TMA-2 and HCPA represented by the formulas shown below.

There are no particular limitations to the number of carbons of the alicyclic group in the alicyclic monomer (in an alicyclic (meth)acrylate, the number of carbons in the alicyclic (meth)acrylate excluding the (meth)acryloyl group). For instance, an alicyclic monomer whose alicyclic group has 4 to 24 (preferably 5 to 18, more preferably 5 to 12) carbons can be used. In particular, cyclohexyl acrylate (CHA), cyclohexyl methacrylate, isobornyl acrylate (IBXA) and isobornyl methacrylate are preferable. CHA and IBXA are more preferable while CHA is particularly preferable.

The component (B) in the art disclosed herein is preferably selected so that the average number of carbons of the alicyclic group is 12 or less. When the component (B) comprises two or more species of alicyclic monomer, the average number of carbons of the alicyclic group can be determined as a sum of products of the numbers of carbons of the alicyclic groups in the respective alicyclic monomers times the corresponding weight fractions of the respective alicyclic monomers relative to the entire component (B). For instance, with respect to a component (B) consisting of 20 parts by weight of CHA and 10 parts by weight of IBXA, the average number of carbons of the alicyclic group is calculated to be 6(20/30)+10(10/30)=7.3. When the component (B) consists of one species of alicyclic monomer, the number of carbons of the alicyclic group in the alicyclic monomer is the average number of carbons of the alicyclic group in the component (B).

In an embodiment where the average number of carbons of the alicyclic group in the component (B) is 12 or less, a PSA can be obtained with greater oil-caused clouding resistance. From such a standpoint, the average number of carbons of the alicyclic group is more preferably 10 or less. The lower limit of the average number of carbons of the alicyclic group is not particularly limited. From the standpoint of the material availability and so on, the average number of carbons of the alicyclic group is advantageously 5 or greater.

The component (C) is a monomer having at least either a hydroxyl group or a carboxyl group.

As the hydroxyl group-containing monomer, any species having a hydroxyl group as well as an unsaturated double bond-containing polymerizable functional group, such as a (meth)acryloyl group or a vinyl group can be used without particular limitations. For the hydroxyl group-containing monomer, solely one species or a combination of two or more species can be used. Examples of the hydroxyl group-containing monomer include 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, and 12-hydroxylauryl (meth)acrylate; and hydroxyalkylcycloalkane (meth)acrylates such as (4-hydroxymethylcyclohexyl)methyl (meth)acrylate. Other examples include hydroxyethyl(meth)acrylamide, allyl alcohol, 2-hydroxyethyl vinyl ether, 4-hydroxybutyl vinyl ether, diethylene glycol monovinyl ether, etc. Among these, hydroxyalkyl (meth)acrylates are preferable. For instance, a hydroxyalkyl (meth)acrylate having a hydroxyalkyl group of 2 to 6 carbons can be preferably used. In a preferable embodiment, as the hydroxyl group containing monomer, one, two or more species can be selected and used from 2-hydroxyethyl acrylate (2HEA), 2-hydroxyethyl methacrylate, 4-hydroxybutyl acrylate (4HBA) and 4-hydroxybutyl methacrylate. In some preferable embodiments of the art disclosed herein, the hydroxyl group containing monomer used can be solely 4HBA, solely 2HEA, or a combination of 4HBA and 2HEA.

As the carboxyl group containing monomer, any monomer having a carboxyl group and an unsaturated double bond-containing polymerizable functional group such as a (meth)acryloyl group or a vinyl group may be used without particular limitations. Carboxyl group containing monomers can be used singly as one species or in combination of two or more species. Examples of the carboxyl group-containing monomer include ethylenic unsaturated monocarboxylic acids such as acrylic acid, methacrylic acid, crotonic acid, carboxyethyl (meth)acrylate, carboxypentyl (meth)acrylate, etc.; and ethylenic unsaturated dicarboxylic acids such as itaconic acid, maleic acid, fumaric acid, citraconic acid, etc.; as well as metal salts (e.g. alkali metal salts) of these; anhydrides of the ethylenic unsaturated dicarboxylic acids such as maleic anhydride, itaconic anhydride, etc.; and the like. Among these, acrylic acid and methacrylic acid are preferable, and acrylic acid is particularly preferable.

The art disclosed herein can be preferably implemented in an embodiment where the component (C) comprises a hydroxyl group-containing monomer. In other words, it is preferable that the component (C) either consists of a hydroxyl group-containing monomer or comprises a hydroxyl group-containing monomer and a carboxyl group containing monomer. When the component (C) comprises a hydroxyl group-containing monomer and a carboxyl group-containing monomer, the hydroxyl group-containing monomer content in the entire component (C) is preferably greater than 50% by weight, or more preferably 80% by weight or greater (e.g. 90% by weight or greater). By increasing the hydroxyl group-containing monomer content in the component (C), great oil-caused clouding resistance can be obtained even with a reduced amount of the carboxyl group-containing monomer. This is preferable from the standpoint of reducing metal corrosion caused by the carboxyl group. The art disclosed herein can be preferably implemented in an embodiment where the monomeric components are essentially free of a carboxyl group-containing monomer. For instance, the carboxyl group-containing monomer content in the monomeric components can be less than 1% by weight, preferably less than 0.5% by weight, or more preferably less than 0.2% by weight.

The component (A) content in the monomeric components is not particularly limited. From the standpoint of the oil-caused clouding resistance, the component (A) content is preferably 90% by weight or less, or more preferably 85% by weight or less. In an embodiment disclosed herein, the component (A) content can be 60% by weight or less (e.g. 50% by weight or less). From the standpoint of obtaining a PSA combining oil-caused clouding resistance and other properties in a good balance, the component (A) content is preferably 30% by weight or greater, or more preferably 35% by weight or greater. In a preferable embodiment, the component (A) content in the monomeric components may be 35 to 70% by weight. For instance, these component (A) content ranges are preferably applied in an embodiment where more than 50% by weight of the component (C) is a hydroxyl group-containing monomer, whereby a PSA can be obtained combining oil-caused clouding resistance and other properties at a higher level. In another preferable embodiment, the component (A) content in the monomeric components can be 55 to 85% by weight. These component (A) content ranges are preferably applied, for instance, in an embodiment where more than 50% by weight of the component (C) is a carboxyl group containing monomer, whereby a PSA can be obtained combining oil-caused clouding resistance and other properties at a higher level.

The component (B) content in the monomeric components is not particularly limited. The component (B) content is usually suitably 3% by weight or greater, or from the standpoint of the oil-caused clouding resistance, it is preferably 5% by weight or greater, or more preferably 8% by weight or greater (e.g. 10% by weight or greater). From the standpoint of obtaining a PSA that combines oil-caused clouding resistance and other properties in a good balance, the component (B) content is suitably 65% by weight or less, preferably 60% by weight or less, or more preferably 55% by weight or less (e.g. 50% by weight or less). In a preferable embodiment, from the standpoint of obtaining greater oil-caused clouding resistance, the component (B) content in the monomeric components can be 15% by weight or greater, 20% by weight or greater, even 25% by weight or greater, or furthermore 30% by weight or greater. These component (B) content ranges are preferably applied, for instance, in an embodiment using solely CHA as the component (B) or in an embodiment where more than 50% by weight of the component (B) is CHA, whereby a PSA can be obtained with greater oil-caused clouding resistance.

The component (C) content in the monomeric components is typically 3% by weight or greater, or from the standpoint of the oil-caused clouding resistance, it is preferably 5% by weight or greater, or more preferably 8% by weight or greater (e.g. 10% by weight or greater). From the standpoint of obtaining a PSA combining oil-caused clouding resistance and other properties in a good balance, the component (C) content is preferably 35% by weight or less, more preferably 30% by weight or less, or yet more preferably 25% by weight or less. In a preferable embodiment, the component (C) content can be 15 to 30% by weight. These component (C) content ranges are preferably applied, for instance, in an embodiment where more than 50% by weight of the component (C) is a hydroxyl group containing monomer, whereby a PSA can be obtained with greater oil-caused clouding resistance.

The monomeric components in the at disclosed herein may comprise, as necessary, other monomer(s) (or "optional monomer(s)" hereinafter) in addition to the component (A), component (B) and component (C).

Examples of these optional monomers include heterocyclic monomers such as a cyclic nitrogen-containing monomer, a cyclic ether group containing monomer, etc. These heterocyclic monomers may advantageously contribute to increase the adhesive strength or cohesive strength of the PSA. Heterocyclic monomers can be used solely as one species or in combination of two or more species.

Any monomer having a cyclic nitrogen-containing structure and an unsaturated double bond-containing polymerizable functional group such as a (meth)acryloyl group or a vinyl group may be used without limitations as the cyclic nitrogen-containing monomer. The cyclic nitrogen-containing structure preferably has a nitrogen atom in the ring structure. Examples of the cyclic nitrogen-containing monomer include lactam-based vinyl monomers such as N-vinylpyrrolidone, N-vinyl-ε-caprolactam, methylvinylpyrrolidone, etc.; oxazoline group-containing monomers such as 2-vinyl-2-oxazoline, 2-vinyl-5-methyl-2-oxazoline, 2-isopropenyl-2-oxazoline, etc.; nitrogen-containing heterocyclic vinyl monomers such as vinylpyridine, vinylpiperidone, vinylpyrimidine, vinylpiperazine, vinylpyrazine, vinylpyrrole, vinylimidazole, vinylmorpholine, etc.; and the like. The cyclic nitrogen-containing monomer may also be a (meth)acrylic monomer having a nitrogen-containing heterocyclic ring such as a morpholine ring, a piperidine ring, a pyrrolidine ring, a piperazine ring, an aziridine ring, etc. Specific examples include N-acryloyl morpholine, N-acryloyl piperidine, N-methacryloyl piperidine, N-acryloyl pyrrolidine, N-acryloyl aziridine, etc. Among them, vinyl lactam monomers are preferable in view of cohesiveness, and N-vinylpyrrolidone is particularly preferable.

Any monomer having a cyclic ether group such as an epoxy group or an oxetane group as well as an unsaturated double bond-containing polymerizable functional group such as a (meth)acryloyl group or a vinyl group may be used without limitations as the cyclic ether group containing monomer. Examples of the epoxy group-containing monomer include glycidyl (meth)acrylate, 3,4-epoxycyclohexylmethyl (meth)acrylate, and 4-hydroxybutyl (meth)acrylate glycidyl ether. Examples of the oxetane group-containing monomer include 3-oxetanylmethyl (meth)acrylate, 3-methyl-oxetanylmethyl (meth)acrylate, 3-ethyl-oxetanylmethyl (meth)acrylate, 3-butyl-oxetanylmethyl (meth)acrylate, and 3-hexyl-oxetanylmethyl (meth)acrylate.

Other examples of the optional monomers include an alkyl (meth)acrylate that does not belong to the component (A), that is, an alkyl (meth)acrylate having an alkyl group with a single carbon or 19 or more (e.g. 19 to 24) carbons. Specific examples of such an alkyl (meth)acrylate include methyl (meth)acrylate, n-nonadecyl (meth)acrylate, isononadecyl (meth)acrylate, n-eicosyl (meth)acrylate, isoeicosyl (meth)acrylate, etc. These can be used singly as one species or in combination of two or more species.

Other examples of the optional monomer include a monomer having a functional group that is neither a hydroxyl group nor a carboxyl group. Such a functional group-containing monomer can be used to introduce crosslinking points in the (meth)acrylic polymer or to increase the cohesive strength of (meth)acrylic polymer. Examples of such a functional group containing monomer include amide group-containing monomers such as (meth)acrylamide, N,N-dimethyl(meth)acrylamide, N-methylol(meth)acrylamide, etc.; cyano group-containing monomers such as acrylonitrile, methacrylonitrile, etc.; sulfonic acid group-containing monomers such as styrene sulfonic acid, allyl sulfonic acid, 2-(meth)acrylamido-2-methylpropanesulfonic acid, etc.; phosphoric acid group-containing monomers such as 2-hydroxyethyl acryloyl phosphate, etc.; keto group-containing monomers such as diacetone (meth)acrylamide, diacetone (meth)acrylate, vinyl methyl ketone, vinyl acetoacetate, etc.; isocyanate group containing monomers such as 2-(meth)acryloyloxyethyl isocyanate, etc.; alkoxyl group-containing monomers such as methoxyethyl (meth)acrylate, ethoxyethyl (meth)acrylate, etc.; alkoxysilyl group-containing monomers such as (3-(meth)acryloxypropyl)trimethoxysilane, (3-(meth)acryloxypropyl)triethoxysilane, etc.; and the like. These can be used singly as one species or in combination of two or more species.

To adjust the (meth)acrylic polymer's Tg or to increase the cohesive strength, etc., the monomeric components in the art disclosed herein may comprise, as the optional monomer, a monomer that is copolymerizable with the components (A), (B) and (C) other than those listed above. Examples of such a copolymerizable monomer include carboxylic acid vinyl esters such as vinyl acetate, vinyl propionate, etc.; aromatic vinyl compounds such as styrene, substituted styrenes (α-methylstyrene, etc.), vinyl toluene, etc.; aromatic ring-containing (meth)acrylates such as aryl (meth)acrylate (e.g. phenyl (meth)acrylate), aryloxyalkyl (meth)acrylate (e.g. phenoxyethyl (meth)acrylate), arylalkyl (meth)acrylate (e.g. benzyl (meth)acrylate), etc.; olefinic monomers such as ethylene, propylene, isoprene, butadiene, isobutylene, etc.; chlorine-containing monomers such as vinyl chloride, vinylidene chloride, etc.; vinyl ether-based monomers such as methyl vinyl ether, ethyl vinyl ether, etc.; a macromonomer having a radically polymerizable vinyl group at the monomer end in a vinylic polymer, and the like. These can be used singly as one species or in combination of two or more species.

The amounts of these optional monomers used are not particularly limited and can be suitably selected. Usually, the total amount of optional monomers used is suitably less than 50% by weight of the monomeric components, preferably 30% by weight or less, or more preferably 20% by weight or less. The art disclosed herein can be preferably implemented in an embodiment where the total amount of optional monomers used is 10% by weight or less (e.g. 5% by weight or less) of the monomeric components. When using an optional monomer, from the standpoint of suitably bringing about the effect to increase the adhesive strength or cohesive strength, the amount of the optional monomer used is suitably 0.5% by weight or more of the monomeric components, or preferably 0.8% by weight or more. The art disclosed herein is preferably implemented also in an embodiment using essentially no optional monomers (e.g. an embodiment where the amount of optional monomers used is 0.3% by weight or less of the monomeric components, or typically 0.1% by weight or less), whereby the problem of the present application can be preferably solved.

The component (A), component (B), component (C) and optional monomers described above are typically monofunctional monomers. In addition to these monofunctional monomers, if necessary, the monomeric components in the art disclosed herein may comprise a polyfunctional monomer to control the PSA's cohesive strength, etc. As used herein, the term "monofunctional monomer" refers to a monomer having a single polymerizable functional group having an unsaturated double bond, such as a (meth)acryloyl group or a vinyl group while the term "polyfunctional monomer" refers to a monomer having at least two such polymerizable functional groups as described below.

The polyfunctional monomer has at least two polymerizable functional groups each with an unsaturated double bond, such as (meth)acryloyl group, vinyl group, etc. Examples of the polyfunctional monomer include an ester of a polyol and a (meth)acrylic acid such as ethylene glycol di(meth)acrylate, propylene glycol di(meth)acrylate, (poly)ethylene glycol di(meth)acrylate, (poly)propylene glycol di(meth)acrylate, neopentyl glycol di(meth)acrylate, pentaerythritol di(meth)acrylate, pentaerythritol tri(meth)acrylate, dipentaerythritol hexa(meth)acrylate, 1,2-ethyleneglycol di(meth)acrylate, 1,4-butanediol di(meth)acrylate, 1,6-hexanediol di(meth)acrylate, 1,12-dodecanediol di(meth)acrylate, trimethylolpropane tri(meth)acrylate, tetramethylolmethane tri(meth)acrylate, etc.; allyl (meth)acrylate, vinyl (meth)acrylate, divinylbenzene, epoxy acrylate, polyester acrylate, urethane acrylate, and the like. Among them, trimethylolpropane tri(meth)acrylate, 1,6-hexanediol di(meth)acrylate, and dipentaerythritol hexa(meth)acrylate can be preferably used. The polyfunctional monomers can be used solely as one species or in combination of two or more species. From the standpoint of the reactivity, etc., it is usually preferable to use a polyfunctional monomer having two or more acryloyl groups.

The amount of the polyfunctional monomer used may vary depending on its molecular weight and the number of functional groups. From the standpoint of combining well-balanced cohesive strength and adhesive strength, it is preferably 3% by weight or less, more preferably 2% by weight or less, or even more preferably 1% by weight or less (e.g. 0.5% by weight or less) of the monomeric components. When using a polyfunctional monomer, its lower limit of use should just be greater than 0% by weight and is not particularly limited. In usual, when the polyfunctional monomer used accounts for 0.001% by weight or greater (e.g. 0.01% by weight or greater) of the monomeric components, the effect to increase the cohesive strength can be suitably obtained.

Although not particularly limited, the combined components (A), (B) and (C) content in the monomeric components is typically greater than 50% by weight, preferably 70% by weight or greater, more preferably 80% by weight or greater, or yet more preferably 90% by weight or greater. The art disclosed herein can be preferably implemented in an embodiment where their combined content is 95% by weight or greater (e.g. 99% by weight or greater). Their combined content can be 100% by weight. The at disclosed herein can be preferably implemented in an embodiment where their combined content accounts for 99.999% by weight or less (e.g. 99.99% by weight or less) of the monomeric components.

In the art disclosed herein, the weight Wb of the component (B) and the weight Wc of the component (C) in the monomeric components preferably satisfy a relationship 0.8≤Wb/Wc. In other words, the monomeric components preferably comprise the component (B) in an amount equal to or greater than 0.8 times the component (C) based on weight. This can bring about great oil-caused clouding resistance. From the standpoint of obtaining greater oil-caused clouding resistance, Wb/Wc is preferably 0.9 or greater, or more preferably 1 or greater. In a preferable embodiment, Wb/Wc can be greater than 1 or may be even 1.5 or greater. The upper limit of Wb/Wc is not particularly limited. The value of Wb/Wc is usually suitably 10 or smaller (e.g. 5 or smaller). In a preferable embodiment, Wb/Wc is 3 or smaller (e.g. smaller than 3, or even 2.5 or smaller), whereby greater oil-caused clouding resistance can be obtained.

Although not particularly limited, the combined components (B) and (C) content in the monomeric components can be, for instance, 10% by weight or greater, or from the standpoint of the oil-caused clouding resistance, it is preferably 15% by weight or greater. In a preferable embodiment, the combined (B) and (C) content is 20% by weight or greater (preferably 30% by weight or greater, more preferably 40% by weight or greater, or more preferably 45% by weight or greater, e.g. 50% by weight or greater), whereby greater oil-caused clouding resistance can be obtained. These combined (B) and (C) content ranges are preferably applied in an embodiment where more than 50% by weight of the component (C) is a hydroxyl group-containing monomer, whereby a PSA can be obtained with greater oil-caused clouding resistance. From the standpoint of combining oil-caused clouding resistance and other properties at a high level, the combined (B) and (C) content is usually suitably 70% by weight or less, or preferably 65% by weight or less.

In the art disclosed herein, there are no particular limitations to the relationship of the weight Wa of the component (A) and the weight Wb of the component (B) in the monomeric components. In the monomeric components, for instance, Wa/Wb is preferably 0.8 or greater (more preferably 0.9 or greater). In a preferable embodiment, Wa/Wb is suitably 5 or smaller, preferably 3.5 or smaller, more preferably 2.5 or smaller, or yet more preferably 2 or smaller (e.g. 1.5 or smaller). These ranges of the Wa/Wb value are preferably applied, for instance, in an embodiment where more than 50% by weight of the component (C) is a hydroxyl group-containing monomer, whereby a PSA can be obtained with greater oil-caused clouding resistance. In another preferable embodiment, Wa/Wb can be 1 to 9, or may also be 2 to 6. The Wa/Wb value ranges are preferably applied, for instance, in an embodiment where more than 50% by weight of the component (C) is a carboxyl group-containing monomer, whereby a PSA can be obtained combining oil-caused clouding resistance and other properties at a higher level.

Although not particularly limited, from the standpoint of the PSA's adhesiveness and low temperature characteristics, etc., the copolymer corresponding to the composition of the monomeric components has a Tg value of preferably −20° C. or below, or more preferably −25° C. or below. From the standpoint of the PSA's oil-caused clouding resistance and cohesiveness, the Tg of the copolymer is suitably −55° C. or above, preferably −50° C. or above, or more preferably 45° C. or above. With the copolymer's Tg value being −40° C. or above (e.g. −35° C. or above), greater oil-caused clouding resistance can be obtained.

Herein, the Tg of the copolymer corresponding to the composition of the monomeric components refers to a value determined by the FOX equation based on the Tg values of homopolymers of the respective monomers and weight fractions of the monomers. In this description, Tg values are determined based on only monofunctional monomers. Accordingly, when the monomeric components include a polyfunctional monomer, the combined amount of monofunctional monomers in the monomeric components is counted as 100% by weight, and the Tg value is determined based on the Tg values of homopolymers of the respective monofunctional monomers and the weight fractions of the monofunctional monomers relative to their combined amount.

As the Tg values of homopolymers, the following values are used with respect to the monomers shown next

| | |
|---|---|
| 2-Ethylhexyl acrylate | −70° C. |
| n-Butyl acrylate | −55° C. |
| Isostearyl acrylate | −18° C. |
| Cyclohexyl acrylate | 15° C. |
| Isobornyl acrylate | 94° C. |
| 2-Hydroxyethyl acrylate | −15° C. |
| 4-Hydroxybutyl acrylate | −40° C. |
| Acrylic acid | 106° C. |

With respect to monomers other than those listed above, for the Tg values of the corresponding homopolymers, values given in "Polymer Handbook" (3rd edition, John Wiley & Sons, Inc., Year 1989) are used. When the literature provides two or more values for a certain monomer, the highest value is used.

When no values are given in the reference book, values obtained by the following measurement method are used (see Japanese Patent Application Publication No. 2007-51271).

In particular, to a reaction vessel equipped with a thermometer, a stirrer, a nitrogen inlet and a condenser, are added 100 parts by weight of monomer(s), 02 part by weight of azobisisobutyronitrile, and 200 parts by weight of ethyl acetate as a polymerization solvent, and the mixture is stirred for one hour under a nitrogen gas flow. After oxygen is removed in this way from the polymerization system, the mixture is heated to 63° C. and the reaction is carried out for 10 hours. Then, it is cooled to room temperature and a homopolymer solution having 33% by weight solid content is obtained. Then, this homopolymer solution is applied onto a release liner by flow coating and allowed to dry to prepare a test sample (a homopolymer sheet) of about 2 mm thickness. This test sample is cut out into a disc of 7.9 mm diameter and is placed between parallel plates; and while applying a shear strain at a frequency of 1 Hz using a rheometer (trade name "ARES" available from Rheometrics Scientific, Inc.), the viscoelasticity is measured in the shear mode over a temperature range of −70° C. to 150° C. at a heating rate of 5° C./min; and the temperature value at the maximum of the tan δ (loss tangent) curve is taken as the Tg of the homopolymer.

Although not particularly limited, the copolymer corresponding to the composition of the monomeric components preferably has a Tg value higher by at least 8° C. than the Tg value of the copolymer corresponding to the composition of the monomeric components excluding the component (B). Hereinafter, the difference between the Tg values of these copolymers may be represented by "$\Delta Tg_1$." With the monomeric components having such a composition, a PSA can be preferably obtained with great oil-caused clouding resistance. From the standpoint of obtaining greater oil-caused clouding resistance, $\Delta Tg_1$ is preferably at least 10° C., more preferably at least 15° C., or yet more preferably at least 20° C. From the standpoint of combining oil-caused clouding resistance and other properties (e.g. adhesiveness, cohesiveness) more favorably, $\Delta Tg_1$ is preferably 35° C. or smaller, or more preferably 30° C. or smaller (e.g. 25° C. or smaller). The Tg value of the copolymer corresponding to the composition of the monomeric components excluding the component (B) refers to a value determined by the FOX equation. In particular, the total amount of all monofunctional monomers, excluding the component (B), in the monomeric components is counted as 100% by weight, and the Tg value is determined based on the Tg values of homopolymers of the respective monomers excluding the component (B) and the weight fractions of the monofunctional monomers relative to their combined amount.

Although not particularly limited, the copolymer corresponding to the composition of the monomeric components preferably has a Tg value higher by at least 10° C. than the Tg value of the copolymer corresponding to the composition of the monomeric components excluding the components (B) and (C). Hereinafter, the difference between the Tg values of these copolymers may be represented by "$\Delta Tg_2$." With the monomeric components having such a composition, a PSA can be preferably obtained with great oil-caused clouding resistance. From the standpoint of obtaining greater oil-caused clouding resistance, $\Delta Tg_2$ is preferably at least 15° C., or more preferably at least 20° C. From the standpoint of combining oil-caused clouding resistance and other properties (e.g. adhesiveness, cohesiveness) more favorably, $\Delta Tg_2$ is preferably 40° C. or smaller, or more preferably 35° C. or smaller. The Tg value of the copolymer corresponding to the composition of the monomeric components excluding the components (B) and (C) refers to a value determined by the FOX equation. In particular, the total amount of all monofunctional monomers, excluding the components (B) and (C), in the monomeric components is counted as 100% by weight, and the Tg value is determined based on the Tg values of homopolymers of the respective monomers excluding the components (B) and (C) and the weight fractions of the monofunctional monomers relative to their combined amount.

<PSA Composition>

The PSA composition disclosed herein may comprise monomeric components having an aforementioned composition, as a polymerized product, in a non-polymerized form (i.e. a form where the polymerizable functional groups are unreacted), or as a mixture of these. The PSA composition may be in various forms such as a solvent-based PSA composition which comprises PSA (adhesive components) in an organic solvent; an aqueous PSA composition which comprises PSA dispersed in an aqueous solvent; an active energy ray-curable PSA composition prepared so as to form PSA when cured with active energy rays such as UV rays, radioactive rays, etc.; a hot melt-type PSA composition which is heated to melting for application and allowed to cool to around room temperature to form PSA; and the like.

The PSA composition typically comprises at least some (possibly a certain species among the monomers or a fraction of the quantity) of the monomeric components as a polymer. The polymerization method for forming the polymer is not particularly limited. Heretofore known various polymerization methods can be suitably used. For instance, thermal polymerization (typically carried out in the presence of a thermal polymerization initiator) such as solution polymerization, emulsion polymerization, bulk polymerization, etc.; photopolymerization carried out by irradiating light such as UV light, etc. (typically in the presence of a photopolymerization initiator); active energy ray polymerization carried out by irradiating radioactive rays such as β rays, γ rays, etc.; and the like. In particular, photopolymerization is preferable. In these polymerization methods, the embodiment of polymerization is not particularly limited. It can be carried out with a suitable selection of a heretofore known monomer supply method, polymerization conditions (temperature, time, pressure, irradiance of light, irradiance of radioactive rays, etc.), materials (polymerization initiator, surfactant, etc.) used besides the monomers, etc.

For the polymerization, depending on the polymerization method and embodiment of polymerization, etc., a known or commonly used photopolymerization initiator or thermal polymerization initiator can be used. These polymerization initiators can be used singly as one species or in a suitable combination of two or more species.

Examples of the photopolymerization initiator include, but not particularly limited to, ketal-based photopolymerization initiators, acetophenone-based photopolymerization initiators, benzoin ether-based photopolymerization initiators, acylphosphine oxide-based photopolymerization initiators, α-ketol-based photopolymerization initiators, aromatic sulfonyl chloride-based photopolymerization initiators, photoactive oxime-based photopolymerization initiators, benzoin-based photopolymerization initiators, benzil-based photopolymerization initiators, benzophenone-based photopolymerization initiators, thioxanthone-based photopolymerization initiators and the like.

Specific examples of ketal-based photopolymerization initiators include 2,2-dimethoxy-1,2-diphenylethane-1-one (e.g. trade name "IRGACURE 651" available from BASF Corporation), etc.

Specific examples of acetophenone-based photopolymerization initiators include 1-hydroxycyclohexyl phenyl ketone (e.g. trade name "IRGACURE 184" available from BASF Corporation), 4-phenoxydichloroacetophenone, 4-t-butyl-dichloroacetophenone, 1-[4-(2-hydroxyethoxy)-phenyl]-2-hydroxy-hydroxy-2-methyl-1-propane-1-one (e.g. trade name "IRGACURE 2959" available from BASF Corporation), 2-hydroxy-2-methyl-1-phenyl-propane-1-one (e.g. trade name "DAROCUR 1173" available from BASF Corporation), methoxyacetophenone, etc.

Specific examples of benzoin ether-based photopolymerization initiators include benzoin ethers such as benzoin methyl ether, benzoin ethyl ether, benzoin propyl ether, benzoin isopropyl ether, benzoin isobutyl ether, etc., as well as substituted benzoin ethers such as anisole methyl ether, etc.

Specific examples of acylphosphine oxide-based photopolymerization initiators include bis(2,4,6-trimethylbenzoyl)phenylphosphine oxide (e.g. trade name "IRGACURE 819" available from BASF Corporation), bis(2,4,6-trimethylbenzoyl)-2,4-di-n-butoxyphenylphosphine oxide, 2,4,6-trimethylbenzoyldiphenylphosphine oxide (e.g. trade name "LUCIRIN TPO" available from BASF Corporation), bis(2,6-dimethoxybenzoyl)-2,4,4-trimethylpentylphosphine oxide, etc.

Specific examples of α-ketol-based photopolymerization initiators include 2-methyl-2-hydroxypropiophenone, 1-[4-(2-hydroxyethyl)phenyl]-2-methylpropane-1-one, etc. Specific examples of aromatic sulfonyl chloride-based photopolymerization initiators include 2-naphthalenesulfonyl chloride, etc. Specific examples of photoactive oxime-based photopolymerization initiators include 1-phenyl-1,1-propanedione-2-(o-ethoxycarbonyl)-oxime, etc. Specific examples of benzoin-based photopolymerization initiators include benzoin, etc. Specific examples of benzil-based photopolymerization initiators include benzil, etc.

Specific examples of benzophenone-based photopolymerization initiators include benzophenone, benzoylbenzoic acid, 33'-dimethyl-4-methoxybenzophenone, polyvinylbenzophenone, α-hydroxycyclohexylphenylketone, etc.

Specific examples of thioxanthone-based photopolymerization initiators include thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, isopropylthioxanthone, 2,4-diisopropylthioxanthone, dodecylthioxanthone, etc.

The thermal polymerization initiator is not particularly limited. For example, can be used an azo-based polymerization initiator, peroxide-based polymerization initiator, a redox-based polymerization initiator by combination of a peroxide and a reducing agent, a substituted ethane-based polymerization initiator, etc. More specific examples include, but not limited to, azo-based initiators such as 2,2'-azobisisobutyronitrile, 2,2'-azobis(2-methylpropionamidine)disulfate, 2,2'-azobis(2-amidinopropane)dihydrochloride, 2,2'-azobis[2-(5-methyl-2-imidazolin-2-yl)propane]dihydrochloride, 2,2'-azobis(N,N'-dimethyleneisobutylamidine), 2,2'-azobis[N-(2-carboxyethyl)-2-methylpropionamidine]hydrate, etc.; persulfates such as potassium persulfate, ammonium persulfate, etc.; peroxide-based initiators such as benzoyl peroxide, t-butyl hydroperoxide, hydrogen peroxide, etc.; substituted ethane-based initiators such as phenyl-substituted ethane, etc.; redox-based initiators such as combination of a persulfate salt and sodium hydrogen sulfite, combination of a peroxide and sodium ascorbate, etc.; and the like. Thermal polymerization can be preferably carried out at a temperature of, for instance, about 20° C. to 100° C. (typically 40° C. to 80° C.).

Such thermal polymerization initiator or photopolymerization initiator can be used in a usual amount in accordance with the polymerization method, embodiment of polymerization, etc., and there are no particular limitations to the amount. For instance, relative to 100 parts by weight of monomers to be polymerized, a 0.001 to 5 parts by weight (typically 0.01 to 2 parts by weight, e.g. 0.01 to 1 part by weight) of polymerization initiator can be used.

(PSA Composition Comprising Polymerized and Non-Polymerized (Unreacted) Monomeric Components)

The PSA composition according to a preferable embodiment comprises a polymerization product of a monomer mixture comprising at least some of the monomeric components (starting monomers) that constitute the composition. Typically, of the monomeric components, some are included as a polymerized product and the rest are included as unreacted monomers. The polymerization product of the monomer mixture can be prepared by polymerizing the monomer mixture at least partially.

The polymerization product is preferably a partially-polymerized product of the monomer mixture. Such a partially-polymerized product is a mixture of a polymer formed from the monomer mixture and unreacted monomers, and is typically in a form of syrup (viscous liquid). Hereinafter, a partially-polymerized product having such a form may be referred to as "monomer syrup" or simply syrup.

The polymerization method for obtaining the polymerization product from the monomers is not particularly limited. A suitable method can be selected and employed among various polymerization methods as those described earlier. From the standpoint of the efficiency and convenience, a photopolymerization method can be preferably employed. According to a photopolymerization, depending on the polymerization conditions such as irradiation light quantity, etc., the polymer conversion of the monomer mixture can be easily controlled.

With respect to the partially-polymerized product, the monomer conversion of the monomer mixture is not particularly limited. The monomer conversion can be, for instance, 70% by weight or lower, or preferably 60% by weight or lower. From the standpoint of facile preparation of the PSA composition comprising the partially-polymerized product and ease of application, etc., the monomer conversion is usually suitably 50% by weight or lower, or preferably 40% by weight or lower (e.g. 35% by weight or lower). The lower limit of monomer conversion is not particularly limited. It is typically 1% by weight or higher, or usually suitably 5% by weight or higher.

The PSA composition comprising a partially-polymerized product of the monomer mixture can be easily obtained, for instance, by partially polymerizing a monomer mixture comprising all the starting monomers in accordance with a suitable polymerization method (e.g. photopolymerization). To the PSA composition comprising the partially-polymerized product, other components (e.g. photopolymerization initiator, polyfunctional monomer(s), crosslinking agent, acrylic oligomer described later, etc.) may be added as necessary. Methods for adding such other components are not particularly limited. For instance, they can be added to the monomer mixture in advance or added to the partially-polymerized product.

The PSA composition disclosed herein may also be in a form where a fully-polymerized product of a monomer mixture comprising certain species (starting monomers) among the monomeric components is dissolved in the rest of the monomers (unreacted) or a partially-polymerized product thereof. A PSA composition in such a form is also included in examples of the PSA composition comprising polymerized and non-polymerized (unreacted) monomeric components. As used herein, the term "fully-polymerized product" refers to a product whose monomer conversion is higher than 95% by weight.

When forming PSA from a PSA composition comprising polymerized and non-polymerized monomeric components, a photopolymerization method can be preferably employed as the curing method (polymerization method). With respect to a PSA composition comprising a polymerization product prepared by a photopolymerization method, it is particularly preferable to employ photopolymerization as the curing method. A polymerization product obtained by photopolymerization already contains a photopolymerization initiator. When the PSA composition comprising the polymerization product is cured to form PSA, the photo-curing can be carried out without any additional photopolymerization initiator. Alternatively, the PSA composition may be obtained by adding a photopolymerization initiator as necessary to the polymerization product prepared by photopolymerization. The additional photopolymerization initiator may be the same as or different from the photopolymerization initiator used in preparing the polymerization product. If the PSA composition is prepared by a method other than photopolymerization, a photopolymerization initiator can be added to make it light-curable. The light-curable PSA composition is advantageous as it can readily form even a thick PSA layer. In a preferable embodiment, the PSA composition can be photopolymerized by UV irradiation to form a PSA. The UV irradiation may be performed using a commonly-known high-pressure mercury lamp, low-pressure mercury lamp, metal halide lamp, or the like.

(PSA Composition Comprising Fully-Polymerized Monomeric Components)

The PSA composition according to another preferable embodiment comprises the monomeric components as a fully-polymerized product. Such a PSA composition may be in a form of, for instance, a solvent-based composition which comprises in an organic solvent a (meth)acrylic polymer which is the fully-polymerized product of the monomeric components, a water-dispersed composition such that the (meth)acrylic polymer is dispersed in an aqueous solvent, etc.

(Crosslinking Agent)

The PSA composition disclosed herein can comprise a crosslinking agent. For the crosslinking agent, a crosslinking agent known or commonly used in the PSA field can be used. Examples include epoxy-based crosslinking agents, isocyanate-based crosslinking agents, silicone-based crosslinking agents, oxazoline-based crosslinking agents, aziridine-based crosslinking agents, silane-based crosslinking agents, alkyletherified melamine-based crosslinking agent, metal chelate-based crosslinking agent, and the like. These can be used singly as one species or in combination of two or more species.

The crosslinking agent content (when two or more species of crosslinking agent are included, their combined amount) is not particularly limited. From the standpoint of obtaining a PSA having well-balanced adhesive properties such as adhesive strength, cohesive strength, etc., the crosslinking agent content is usually preferably 5 parts by weight or less relative to 100 parts by weight of the monomeric components in the PSA composition, preferably 0.001 to 5 parts by weight, more preferably 0.001 to 4 parts by weight, or still more preferably 0.001 to 3 parts by weight. Alternatively, the PSA composition may be free of such a crosslinking agent.

((Meth)Acrylic Oilgomer)

From the standpoint of increasing the adhesive strength, the PSA composition disclosed herein can comprise a (meth) acrylic oligomer. For the (meth)acrylic oligomer, it is preferable to use a polymer having a higher Tg value than the Tg value of the copolymer corresponding to the composition of the monomeric components (which typically, approximately corresponds to the Tg value of the (meth)acrylic polymer contained in PSA formed from the PSA composition). The inclusion of the (meth)acrylic oligomer can increase the adhesive strength of the PSA.

The (meth)acrylic oligomer has a Tg of about 0° C. to about 300° C., preferably about 20° C. to about 300° C., or more preferably about 40° C. to about 300° C. When the Tg falls within these ranges, the adhesive strength can be preferably increased. The Tg value of the (meth)acrylic oligomer is determined by the Fox equation, similarly to the Tg of the copolymer corresponding to the composition of the monomeric components.

The (meth)acrylic oligomer may have a weight average molecular weight (Mw) of 1,000 or larger, but smaller than 30,000, preferably 1,500 or larger, but smaller than 20,000, or more preferably 2,000 or larger, but smaller than 10,000. A weight average molecular weight within these ranges is preferable in obtaining good adhesive strength and good holding properties. The weight average molecular weight of a (meth)acrylic oligomer can be determined by gel permeation chromatography (GPC) as a value based on standard polystyrene. More specifically, it can be determined with HPLC 8020 available from Tosoh Corporation, using two TSKgel GMH-H (20) columns and tetrahydrofuran as an eluent at a flow rate of about 0.5 ml/min.

Examples of monomers forming the (meth)acrylic oligomer include alkyl (meth)acrylate such as methyl (meth) acrylate, ethyl (meth)acrylate, propyl (meth)acrylate, isopropyl (meth)acrylate, butyl (meth)acrylate, isobutyl (meth) acrylate, sec-butyl (meth)acrylate, tert-butyl (meth)acrylate, pentyl (meth)acrylate, isopentyl (meth)acrylate, hexyl (meth)acrylate, 2-ethylhexyl (meth)acrylate, heptyl (meth) acrylate, octyl (meth)acrylate, isooctyl (meth)acrylate, nonyl (meth)acrylate, isononyl (meth)acrylate, decyl (meth) acrylate, isodecyl (meth)acrylate, undecyl (meth)acrylate, and dodecyl (meth)acrylate; an ester of (meth)acrylic acid and an alicyclic alcohol, such as cyclohexyl (meth)acrylate, isobornyl (meth)acrylate, and dicyclopentanyl (meth)acrylate; aryl(meth)acrylate such as phenyl (meth)acrylate and benzyl (meth)acrylate; and a (meth)acrylate derived from a terpene compound derivative alcohol. These (meth)acrylates may be used solely as one species or in combination of two or more species.

From the standpoint of further increasing the adhesiveness, the (meth)acrylic oligomer preferably comprises, as a monomeric unit, an acrylic monomer having a relatively bulky structure, typified by an alkyl (meth)acrylate having a branched alkyl group, such as isobutyl (meth)acrylate, tert-butyl (meth)acrylate, etc.; an ester of a (meth)acrylic acid and an alicyclic alcohol, such as cyclohexyl (meth)acrylate, isobornyl (meth)acrylate, dicyclopentanyl (meth)acrylate, etc.; or an aryl (meth)acrylate such as phenyl (meth)acrylate, benzyl (meth)acrylate, etc. When UV light is used in synthesizing the (meth)acrylic oligomer or forming the PSA layer, a saturated oligomer is preferable because it is less likely to inhibit polymerization. An alkyl (meth)acrylate having a branched alkyl group or an ester of an alicyclic alcohol is preferably used as a monomer constituting the (meth)acrylic oligomer.

From these points of view, preferable examples of the (meth)acrylic oligomer include the respective homopolymers of dicyclopentanyl methacrylate (DCPMA), cyclohexymethacrylate (CHMA), isobornyl methacrylate (IBXMA), isobornyl acrylate (IBXA), dicyclopentanyl acrylate (DCPA), 1-adamanthyl methacrylate (ADMA), and 1-adamanthyl acrylate (ADA); as well as a copolymer of CHMA and isobutyl methacrylate (IBMA), a copolymer of CHMA and IBXMA, a copolymer of CHMA and acryloyl morpholine (ACMO), a copolymer of CHMA and diethylacrylamide (DEAA), a copolymer of ADA and methyl methacrylate (MMA), a copolymer of DCPMA and IBXMA, a copolymer of DCPMA and MMA, etc.

The (meth)acrylic oligomer content, if any, in the PSA composition is not particularly limited. From the standpoint of the oil-caused clouding resistance, it is preferably 20 parts by weight or less relative to 100 parts by weight of the monomeric components in the PSA composition, more preferably 15 parts by weight or less, or even more preferably 10 parts by weight or less. A lower (meth)acrylic oligomer content is preferable also from the standpoint of decreasing the rate of sebum swelling of the PSA. The art disclosed herein can be implemented preferably also in an embodiment using no (meth)acrylic oligomers.

Besides these, the PSA composition disclosed herein may comprise various additives known in the PSA field. Depending on the application, suitable additives can be added, for example, powdered materials such as colorants and pigments, dyes, surfactant, plasticizer, tackifier resin, surface lubricant, leveling agent, softener, antioxidant, anti-aging agent, photostabilizer, UV absorber, polymerization inhibitor, inorganic or organic filler, metal in a form of powder, particles or foil, etc.

<PSA Layer and PSA Sheet>

The PSA layer disclosed herein can be obtained from the PSA composition described above. The thickness of the PSA layer is not particularly limited. For instance, it can be about 1 µm to 400 µm. Usually, the PSA layer has a thickness of preferably 1 µm to 200 µm, more preferably 2 µm to 150 µm, yet more preferably 2 µm to 100 µm, or particularly preferably 5 µm to 75 µm.

Although not particularly limited, the PSA layer disclosed herein preferably has such oil-caused clouding resistance that with respect to the PSA layer measuring 50 µm thick, the haze value upon oil contact is 7% or lower when measured by a method described later in the worked examples. The PSA layer has a haze value upon oil contact of preferably 0 to 5%, more preferably 0 to 3%, or particularly preferably 0 to 2% (e.g. 0 to 1.5%).

Although not particularly limited, the PSA layer disclosed herein preferably has such initial transparency that with respect to the PSA layer measuring 50 µm thick, the haze value before oil contact (initial haze value) is 2% or lower when measured by a method described later in the worked examples. When the PSA layer is used in optical applications, an initial haze value of 2% or lower is especially meaningful. The initial haze value of the PSA layer is preferably 0 to 1.5%, or more preferably 0 to 1%.

Although not particularly limited, with respect to the PSA layer disclosed herein, a change in haze value upon oil contact (the haze value upon oil contact minus the initial haze value) is preferably 7% or less, more preferably 0 to 5%, yet more preferably 0 to 3%, or particularly preferably 0 to 1.5% (e.g. 0 to 1%).

Although not particularly limited, the PSA layer disclosed herein has a rate of sebum swelling of preferably 1.4 or less, more preferably 1.3 or less, even more preferably less than 1.2, or still more preferably less than 1.1 when measured by a method described below. A lowest possible rate of sebum swelling is preferable while the ideal value is 1.0.

(Measurement of Rate of Sebum Swelling)

A 100 µm thick PSA layer having a 3 cm by 3 cm area is adhered over a first surface to a polyester film and over the second surface to an alkali glass surface to prepare a test piece. At 50° C., 95% RH, the test piece is immersed for 120 hours in a sebum liquid containing 41 parts by weight of triglyceride (trade name "LEXOL GT-865 available from INOLEX), 16.4 parts by weight of isostearic acid (available from Wako Pure Chemical Industries, Ltd.) and 12 parts by weight of squalene (available from Wako Pure Chemical Industries, Ltd.). The final area (area after the swelling) ($cm^2$) of the PSA layer is measured. From the result, the rate of sebum swelling is determined according to the equation shown below.

Rate of sebum swelling=Final area($cm^2$)/Initial area(9 $cm^2$)

The gel fraction of the PSA layer disclosed herein is not particularly limited. Usually, it has a gel fraction of preferably 99.5% by weight or lower, more preferably 20 to 99.5% by weight, or even more preferably 50 to 99.5% by weight. When the PSA composition comprises a crosslinking agent, the gel fraction can be controlled by adjusting the amount of crosslinking agent added while sufficiently considering the effect of temperature and time of crosslinking treatment A PSA layer having such a gel fraction may be highly oil-caused clouding resistance while having a low rate of sebum swelling.

The PSA sheet disclosed herein (possibly in a long sheet form such as tape, etc.) has the PSA layer at least on one face of a support. In such a PSA sheet, the surface of the support in contact with the PSA layer may be a releasable surface (from which the PSA layer can be removed) or a non-releasable surface.

Figure 1:
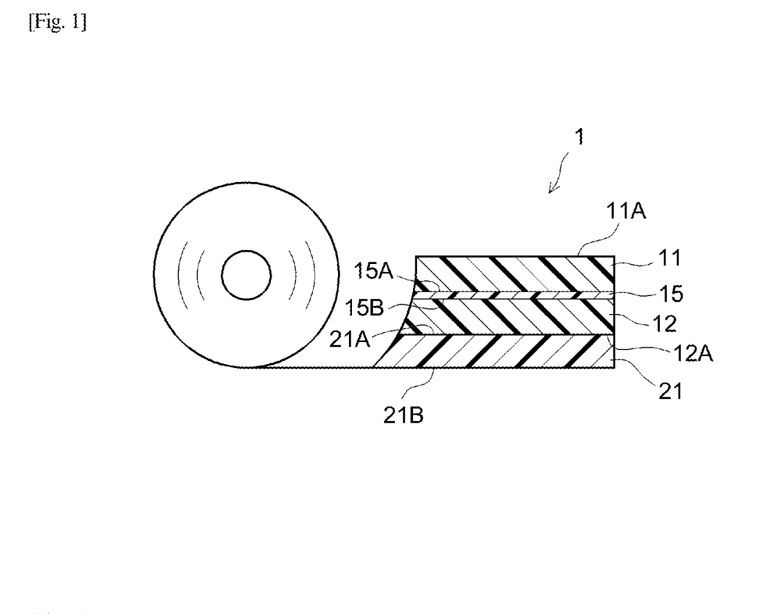
FIG. 1 shows a cross-sectional view schematically illustrating the constitution of a PSA sheet (substrate-supported double-faced PSA sheet) according to an embodiment.

The PSA sheet may be, for instance, a double-faced PSA sheet having a cross-sectional structure shown in FIG. 1. A double-faced PSA sheet 1 comprises a substrate (support) 15, a first PSA layer 11 and a second PSA layer 12 supported on the respective two faces of substrate 15. More specifically, on the first face 15A and second face 15 B (both non-releasable) of substrate 15, the first PSA layer 11 and second PSA layer 12 are provided, respectively. Prior to use (before adhered to an adherend), as shown in FIG. 1, double-faced PSA sheet 1 can be in a roll wherein PSA sheet 1 is wound along with release liner (support) 21 having front face 21A and back face 21B which are both release faces (releasable faces). In double-faced PSA sheet 1 in such an embodiment, the surface (second adhesive face 12A) of second PSA layer 12 and the surface (first adhesive face 11A) of first PSA layer 11 are protected with front face 21A and back face 21B of release liner 21, respectively. Alternatively, it may be in an embodiment where first adhesive face 11A and second adhesive face 12A are protected with two separate release liners (supports), respectively.

Figure 2:
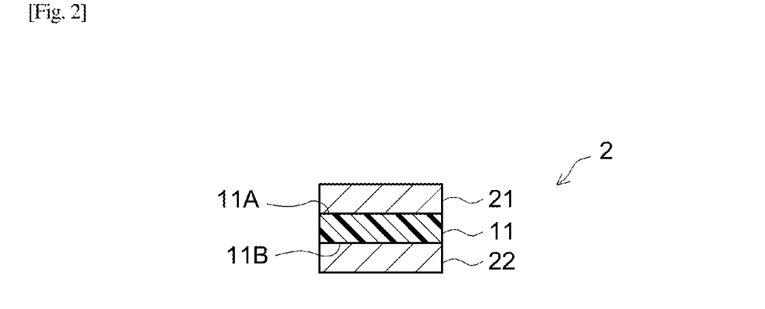
FIG. 2 shows a cross-sectional view schematically illustrating the constitution of a PSA sheet (substrate-free double-faced PSA sheet) according to another embodiment.

The art disclosed herein is preferably applied to a double-faced PSA sheet including a substrate as shown in FIG. 1 and can also be applied to a double-faced PSA sheet 2 free of a substrate (i.e. not having a substrate) as shown in FIG. 2. Prior to use, double-faced PSA sheet 2 can be, for instance, in an embodiment as shown in FIG. 2 where the first adhesive face 11A and the second adhesive face 11B of substrate-free PSA layer 11 are protected with release liners (supports) 21 and 22, respectively, with each release liner comprising a release face at least on the PSA-layer-side surface (front face). Alternatively, it may be in an embodiment without release liner 22, wherein both the two faces of release liner 21 are release faces, and PSA layer 11 is overlaid therewith and wound in a roll so that the back face of release liner 21 contacts and protects second adhesive face 11B.

Figure 3:
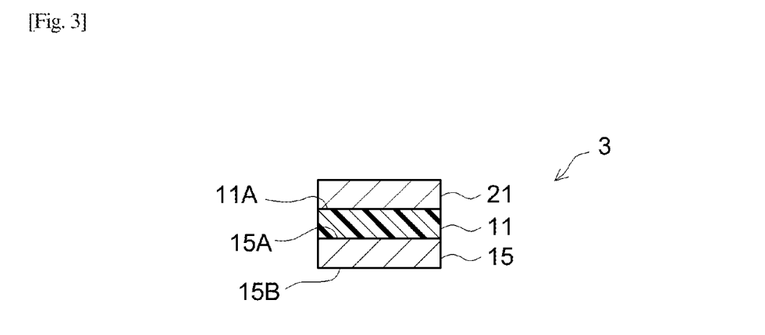
FIG. 3 shows a cross-sectional view schematically illustrating the constitution of a PSA sheet (substrate-supported single-faced PSA sheet with a substrate) according to another embodiment.

As shown in FIG. 3, the at disclosed herein can be applied to a single-faced, substrate-supported PSA sheet 3 comprising a substrate (support) 15 and a PSA layer 11 supported by a first face (non-releasable face) 15A of the substrate. Prior to use, double-faced PSA sheet 3 can be, for instance, in an embodiment as shown in FIG. 3 where the surface (adhesive face) 11A of the PSA layer 11 is protected with a release liner (support) 21 comprising a release face at least on the PSA-layer-side surface (front face). Alternatively, it may be in an embodiment without a release liner 21, wherein with the use of substrate 15 having a release face on the second face 15B, substrate-supported PSA sheet 3 is wound in a roll so that the second face 15 B of substrate 15 contacts and protects the first adhesive face 11A.

In a single-faced or double-faced, substrate-supported PSA sheet, as the substrate, a plastic film, paper, woven fabric, non-woven fabric, rubber sheet, foam sheet, metal foil, glass, a composite of these, and the like can be used. In the substrate, the surface onto which the PSA layer is provided may have been subjected beforehand to a surface treatment such as primer coating, corona discharge treatment, plasma treatment, etc. In this description, the plastic film is typically a non-porous sheet and is conceptually distinct from the non-woven fabric (i.e. conceptually excludes the non-woven fabric). The plastic film may be a non-stretched film, uni-axially stretched film or bi-axially stretched film.

From the standpoint of benefiting from the oil-caused clouding resistance of the PSA layer disclosed herein, as the substrate, various types of transparent plastic film can be preferably used. Examples of the material of such a transparent plastic film include polyester-based resins such as polyethylene terephthalate, polyethylene naphthalate, etc.; cellulose-based resins such as triacetyl cellulose, etc.; acetate-based resins; polysulfone-based resins; polyether sulfone-based resins, polycarbonate-based resins; polyamide-based resins; polyimide-based resins; polyolefinic resins; cyclic polyolefinic resins (norbornene-based resins), (meth)acrylic resins; polyvinyl chloride-based resins; polyvinylidene chloride-based resins; polystyrene-based resins; polyvinyl alcohol-based resins; polyarylate-based resins; polyphenylene sulfide-based resins; a mixture of these; and the like. Particularly preferable materials include polyester-based resins, cellulose-based resins, polyimide-based resins and polyether sulfone-based resins.

The thickness of the substrate is not particularly limited and can be suitably selected depending on the purpose. It is generally 10 μm to 500 μm, or preferably 10 μm to 300 μm. In a preferable embodiment, a substrate (e.g. an aforementioned transparent plastic film) having a thickness of 15 μm to 200 μm can be preferably used.

As the release liner, conventional release papers and the like can be used without particular limitations. For example, can be used a release liner having a release layer on a surface of a substrate such as a plastic film or paper, etc.; a release liner formed from a poorly adhesive material such as a fluorine-based polymer (polytetrafluoroethylene, etc.) and polyolefin-based resin (polyethylene, polypropylene, etc.); and the like. The release layer may be formed, for instance, by subjecting the substrate to a surface treatment by a release agent. Examples of the release agent include a silicone-based release agent, a long chain alkyl-based release agent, a fluorine-based release agents and molybdenum(IV) sulfide, etc.

For example, the PSA layer disclosed herein can be formed as a PSA sheet, by applying any of the PSA compositions disclosed herein to a support followed by drying or curing. The PSA composition can be applied by various known methods. Specific examples include methods such as roll coating, kiss roll coating, gravure coating, reverse coating, roll brush coating, spray coating, dip roll coating, bar coating, knife coating, air knife coating, curtain coating, lip coating, and extrusion coating with a die coater or the like.

The PSA composition can be heated to dry. The drying temperature is preferably 40° C. to 200° C., more preferably 50° C. to 180° C., or particularly 70° C. to 170° C. When heated at a temperature in these ranges, a PSA layer can be obtained with excellent adhesive properties. The drying time may be appropriately selected. The drying time is preferably 5 seconds to 20 minutes, more preferably 5 seconds to 10 minutes, or particularly preferably 10 seconds to 5 minutes.

The PSA layer or PSA sheet disclosed herein is less susceptible to reduction of transparency even upon oil contact and is thus preferable for optical applications. For instance, it is useful as an adhesive optical component that uses an optical material as the support. When using an optical film as the optical material, the adhesive optical component is used as an optical film with a PSA layer. Examples of the optical film include a polarizing plate, retardation plate, optical compensation film, brightness enhancement film, hard coat (HC) film, anti-glare film, impact-absorbing film, anti-fouling film, photochromic film, light control film, wavelength-selective absorbing film, wavelength conversion film, a laminate of these, and the like. The PSA layer or PSA sheet disclosed herein is preferable also for applications in an ophthalmic field. The PSA layer or PSA sheet of the present invention is not limited to optical applications or ophthalmic applications. For instance, it can be used in various applications possibly involving oil contact, in a form of a PSA sheet comprising, as the support, a general anti-fouling film, thermal insulation film, impact-absorbing film, etc.

The matters disclosed by this description include the following.

(1) A pressure-sensitive adhesive composition for forming a pressure-sensitive adhesive comprising a (meth)acrylic polymer, comprising, as monomeric components constituting the (meth)acrylic polymer, (A) an alkyl (meth)acrylate having an alkyl group with 2 to 18 carbons at an ester end, (B) an alicyclic monomer, and (C) a monomer having at least either a hydroxyl group or a carboxyl group, wherein:

the alkyl group in the (A) has an average 8 or less carbons, the monomeric components comprise the (C) at 3% by weight or greater, and the (B) and (C) in the monomeric components have weights Wb and Wc, respectively, satisfying a relationship $0.8 \le Wb/Wc$.

(2) The pressure-sensitive adhesive composition according to (1) above, wherein the (A) comprises an alkyl (meth)acrylate having an alkyl group with up to 5 carbons at the ester end.

(3) The pressure-sensitive adhesive composition according to (1) or (2) above, wherein the average number of carbons of the alkyl group in the (A) is less than 8.

(4) The pressure-sensitive adhesive composition according to any of (1) to (3) above, wherein the monomeric components comprise the (B) and (C) at 15 to 85% by weight in total.

(5) The pressure-sensitive adhesive composition according to any of (1) to (4) above, wherein Wb and Wc satisfy a relationship $1 \le Wb/Wc \le 5$.

(6) The pressure-sensitive adhesive composition according to any of (1) to (5) above, wherein the (C) comprises a monomer having a hydroxyl group.

(7) The pressure-sensitive adhesive composition according to any of (1) to (6) above, wherein a copolymer corresponding to the composition of the monomeric components has a glass transition temperature higher than 45° C., but no higher than −20° C.

(8) The pressure-sensitive adhesive composition according to any of (1) to (7) above, wherein the Tg value of the copolymer corresponding to the composition of the monomeric components is higher by 8° C. or more than the Tg value of a copolymer corresponding to the composition of the monomeric components excluding the component (B).

(9) The pressure-sensitive adhesive composition according to any of (1) to (8) above, wherein the monomeric components comprises a polyfunctional monomer.

(10) The pressure-sensitive adhesive composition according to any of (1) to (9) above comprising a polymerized product of the monomeric components.

(11) The pressure-sensitive adhesive composition according to any of (1) to (10) above comprising a partially-polymerized product of a monomer mixture comprising at least some of the monomeric components.

(12) The pressure-sensitive adhesive composition according to (11) above, wherein the monomer conversion of the monomer mixture is 5% by weight or higher, but 70% by weight or lower.

(13) The pressure-sensitive adhesive composition according to any of (1) to (12) above, further comprising a photopolymerization initiator.

(14) A pressure-sensitive adhesive layer obtainable from the pressure-sensitive adhesive composition according to any of (1) to (13) above.

(15) A pressure-sensitive adhesive layer comprising a (meth)acrylic polymer, wherein the monomeric components constituting the (meth)acrylic polymer comprises:

(A) an alkyl (meth)acrylate having an alkyl group with 2 to 18 carbons at an ester end;

(B) an alicyclic monomer, and (C) a monomer having at least either a hydroxyl group or a carboxyl group;

the alkyl group in the (A) has an average 8 or less carbons, the monomeric components comprise the (C) at 3% by weight or greater, and the (B) and (C) in the monomeric components have weights Wb and Wc, respectively, satisfying a relationship $0.8 \leq Wb/Wc$.

(16) The pressure-sensitive adhesive layer according to (15) above, wherein the (A) comprises an alkyl (meth) acrylate having an alkyl group with up to 5 carbons at the ester end.

(17) The pressure-sensitive adhesive layer according to (15) or (16) above, wherein the average number of carbons of the alkyl group in the (A) is less than 8.

(18) The pressure-sensitive adhesive layer according to any of (15) to (17) above, wherein the monomeric components comprise the (B) and (C) at 15 to 85% by weight in total.

(19) The pressure-sensitive adhesive layer according to any of (15) to (18) above, wherein Wb and Wc satisfy a relationship $1 \leq Wb/Wc \leq 5$.

(20) The pressure-sensitive adhesive layer according to any of (15) to (19) above, wherein the (C) comprises a monomer having a hydroxyl group.

(21) The pressure-sensitive adhesive layer according to any of (15) to (20) above, wherein a copolymer corresponding to the composition of the monomeric components has a glass transition temperature higher than −45° C., but no higher than −20° C.

(22) The pressure-sensitive adhesive layer according to any of (15) to (21) above, wherein the Tg value of the copolymer corresponding to the composition of the monomeric components is higher by 8° C. or more than the Tg value of a copolymer corresponding to the composition of the monomeric components excluding the component (B).

(23) The pressure-sensitive adhesive layer according to any of (15) to (22) above, wherein the monomeric components comprises a polyfunctional monomer.

(24) The pressure-sensitive adhesive layer according to any of (14) to (23) above, wherein the thickness of the pressure-sensitive adhesive layer is 1 μm or greater (preferably 2 μm or greater, more preferably 5 μm or greater).

(25) The pressure-sensitive adhesive layer according to any of (14) to (24) above, wherein the thickness of the pressure-sensitive adhesive layer is 400 μm or less (preferably 200 μm or less, more preferably 150 μm or less, still more preferably 100 μm or less, e.g. 75 μm or less).

(26) A pressure-sensitive adhesive sheet having the pressure-sensitive adhesive layer according to any of (14) to (25) above.

EXAMPLES

Several worked examples relating to the present invention are described below although the present invention is not to be limited to these examples.

LIST OF ABBREVIATIONS

Abbreviations used in the description below represent the following compounds:
BA: n-butyl acrylate
2EHA: 2-ethylhexyl acrylate
ISTA: isostearyl acrylate
CHA: cyclohexyl acrylate
IBXA: isobornyl acrylate
2HEA: 2-hydroxyethyl acrylate
4HBA: 4-hydroxybutyl acrylate
AA: acrylic acid
DPHA: dipentaerythritol hexaacrylate Example 1

(Fabrication of PSA Sheet)
(Sample 1)

Components (A), (B) and (C) (species and amounts shown in Table 1) were mixed with a photopolymerization initiators of 0.05 part by weight of 2,2-dimethoxy-1,2-diphenylethane-1-one (available from BASF Corporation, trade name "IRGACURE 651") and 0.05 parts by weight of 1-hydroxycyclohexyl phenyl ketone (available from BASF Corporation, trade name "IRGACURE 184"). The resulting mixture was irradiated with UV rays in nitrogen atmosphere to prepare a partially-polymerized product (monomer syrup). To the resulting monomer syrup, 0.1 part by weight of DPHA (trade name "KAYARAD DPHA" available from Nihon Kayaku Co., Ltd.) was added and uniformly mixed to prepare a PSA composition.

The resulting PSA composition was coated to a 38 μm thick polyester film (trade name "DIAFOIL MRF" available from Mitsubishi Plastics, Inc.) to finally form a PSA layer having a thickness of 50 μm, with the polyester film having a surface treated with a silicone-based release agent. Subsequently, the surface of the coated PSA composition (coating layer) was covered with a 38 μm thick polyester film (trade name "DIAFOIL MRE" available from Mitsubishi Plastics, Inc.) having a silicone-treated surface, such that the silicone-treated surface of the film was on the coating layer side. The coating layer was thereby shielded from oxygen. The resulting sheet having the coating layer was irradiated and cured with UV rays, using a chemical light lamp (available by Toshiba Corporation) at an irradiance of 5 mW/cm$^2$ for 360 seconds to form a PSA layer, whereby a PSA sheet was obtained. The polyester films placed over the two faces of the PSA layer served as release liners.

The irradiance value was measured with an industrial UV checker (available from Topcon Corporation, trade name "UVR-TI" with light detector model number "UD-T36") with peak sensitivity at 350 nm in wavelength.

(Samples 2-4)

The species and amounts of components (A), (B) and (C) were modified as shown in Table 1. Otherwise, in the same manner as Sample 1, PSA sheets of Samples 2 to 4 were fabricated.

(Evaluation of Properties)

With respect to each of Samples 1 to 4, the release liner covering a first face of the PSA layer (50 μm thick) was removed and the exposed surface of the PSA layer was adhered to a surface of alkali glass of 0.1% haze. Subsequently, the release liner covering the second face of the PSA layer was also removed. Then, under the condition of 70° C., the PSA layer on the alkali glass was soaked completely in the trade name "NIVEA CREAM" (available from Kao Corporation, ingredients: lauryl alcohol, dibutylhydroxytoluene, dibutylhydroxyanisole, tocophenol, a benzoic acid salt, fragrance). The resultant was stored at 70° C. for 60 hours, and wiped with dry cloth to remove the cream from the PSA layer. Using a haze meter (MR-100 available from Murakami Color Research Laboratory Co., Ltd.), the haze of the PSA layer upon oil contact was measured. For the measurement, the PSA layer on the alkali glass was arranged so that the PSA layer faced the light source. The haze value (0.1%) of the alkali glass was subtracted from the measured value to determine the final haze value of the PSA layer upon oil contact (measured value of oil-caused clouding resistance).

The results are shown in Table 1. About each sample, Table 1 also shows the average number of carbons of the alkyl group in component (A), weight ratio of component (B) to component (C) (Wb/Wc), Tg (° C.) of copolymer corresponding to the composition of monomeric components, Tg difference ($\Delta Tg_1$ (° C.)) between the copolymer and the copolymer free of component (B), and Tg difference ($\Delta Tg_2$ (° C.)) between the copolymer and the copolymer free of components (B) and (C).

TABLE 1

| Sample No. | | | 1 | 2 | 3 | 4 |
|---|---|---|---|---|---|---|
| Monomeric components (parts by weight) | (A) | BA | 40 | 25 | 57 | — |
| | | 2EHA | — | 15 | — | 30 |
| | | ISTA | — | — | — | 30 |
| | (B) | CHA | 40 | 40 | 12 | — |
| | | IBXA | — | — | — | 20 |
| | (C) | 2HEA | — | — | 8 | — |
| | | 4HBA | 20 | 20 | 23 | 20 |
| Average number of carbons of alkyl group | | | 4 | 5.5 | 4 | 13 |
| Wb/Wc | | | 2 | 2 | 0.39 | 1 |
| Tg (° C.) | | | −28 | −33 | −42 | −27 |
| $\Delta Tg_1$ (° C.) | | | 22 | 21 | 6 | 19 |
| $\Delta Tg_2$ (° C.) | | | 27 | 32 | 13 | 20 |
| Oil-caused clouding resistance (% haze) | | | 1.1 | 1.3 | 10.5 | 21.4 |

As evident from Table 1, the PSA layers of Samples 1 and 2 had significantly greater oil-caused clouding resistance (significantly lower haze values upon oil contact) as compared to the PSA layers of Sample 3 with Wb/Wc below 0.8 and Sample 4 with an alkyl group having more than 8 carbons (average number).

It is noted that prior to oil contact, the haze was measured for each PSA layer. From the resulting value, the haze value (0.1%) of the alkali glass was subtracted to determine the haze value of the PSA layer before the oil contact (measured value of initial transparency). Samples 1 to 4 all had haze values in a range of 0.4% to 0.5%.

Example 2

The species and amounts of components (A), (B) and (C) were modified as shown in Table 2. Otherwise, in the same manner as Sample 1, PSA sheets of Samples 5 to 11 were fabricated. The resulting PSA sheets were tested for oil-caused clouding resistance in the same manner as Example 1.

The results are shown in Table 2. Herein, the oil-caused clouding resistance is rated as follows: E (excellent oil resistance) when equivalent or superior to Sample 1 in Example 1; P (poor oil-caused clouding resistance) when equivalent or inferior to Sample 3; and G (good oil-caused clouding resistance) when inferior to Sample 1, but clearly superior to Sample 3. For easy comparison with the results in Table 1, the results of Samples 1 and 2 are also shown in Table 2. Table 2 also shows the average number of carbons of the alkyl group and Wb/Wc with respect to the monomeric components of each sample.

TABLE 2

| Sample No. | | | 1 | 2 | 5 | 6 | 7 | 8 | 9 | 10 | 11 |
|---|---|---|---|---|---|---|---|---|---|---|---|
| Monomeric components (parts by weight) | (A) | BA | 40 | 25 | 80 | 60 | 45 | 10 | 80 | 60 | 40 |
| | | 2EHA | — | 15 | — | — | — | 30 | — | — | — |
| | | ISTA | — | — | — | — | — | — | — | — | 40 |
| | (B) | CHA | 40 | 40 | — | 20 | 45 | 40 | — | 10 | — |
| | | IBXA | — | — | 10 | — | — | — | 15 | — | 10 |
| | (C) | 4HBA | 20 | 20 | — | 20 | 10 | 20 | — | 30 | — |
| | | AA | — | — | 10 | — | — | — | 5 | — | 10 |
| Average number of carbons of alkyl group | | | 4 | 5.5 | 4 | 4 | 4 | 7 | 4 | 4 | 11 |
| Wb/Wc | | | 2 | 2 | 1 | 1 | 4.5 | 2 | 3 | 0.33 | 1 |
| Oil-caused clouding resistance (% haze) | | | E | E | E | G | G | G | G | P | P |

As shown in Table 2, the PSA layers of Samples 5 to 9 exhibited clearly greater oil-caused clouding resistance (lower haze values upon oil contact) as compared to the PSA layers of Sample 10 with Wb/Wc below 0.8 and Sample 11 with an alkyl group having more than 8 carbons (average number). In particular, the PSA layer of Sample 5 showed excellent oil-caused clouding resistance comparable to Samples 1 and 2.

Although specific embodiments of the present invention have been described in detail above, these are merely for illustrations and do not limit the scope of the claims. The rat according to the claims includes various modifications and changes made to the specific embodiments illustrated above.

REFERENCE SIGNS LIST

1, 2, 3: PSA sheets
11: first PSA layer
12: second PSA layer
15: substrate (support)
21, 22: release liners (supports)

The invention claimed is:

1. A pressure-sensitive adhesive composition comprising, as monomeric components constituting a (meth)acrylic polymer,
- (A) an alkyl acrylate having an alkyl group with 2 to 18 carbons at an ester end,
- (B) an alicyclic monomer,
- (C) a monomer having at least either a hydroxyl group or a carboxyl group, and
- (D) one or more polyfunctional monomers each having at least two polymerizable functional groups each with an unsaturated double bond, wherein:

the polyfunctional monomers consist of one or more species of polyfunctional monomers having (meth)acryloyl groups as polymerizable functional groups, if the monomeric components include only one alkyl acrylate (A), then the alkyl group in the alkyl acrylate (A) has 2 to 5 carbons, if the monomeric components include two or more of the alkyl acrylates (A), then the alkyl group in the (A) has an average of less than 7 carbons, where the average is determined as a sum of products of the numbers of carbons of the alkyl groups times the corresponding weight fractions of the respective alkyl acrylates relative to the entire weight of the (A), the monomeric components comprise the (B) at 8% by weight or greater and 55% by weight or less, the monomeric components comprise the (C) at 3% by weight or greater, the (B) and (C) in the monomeric components have a weight % Wb and Wc, respectively, satisfying a relationship $1 \leq Wb/Wc \leq 2.5$, the (A) in the monomeric components have a weight % Wa, and if more than 50% by weight of the (C) is a hydroxyl group-containing monomer, then $0.8 \leq Wa/Wb \leq 2.5$.

2. The pressure-sensitive adhesive composition according to claim 1, wherein the alkyl acrylate (A) comprises n-butyl acrylate.

3. The pressure-sensitive adhesive composition according to claim 1, wherein the monomeric components comprise the (B) and (C) at 15 to 85% by weight of the total amount of all the monomeric components.

4. The pressure-sensitive adhesive composition according to claim 1, wherein the (C) comprises a monomer having a hydroxyl group.

5. The pressure-sensitive adhesive composition according to claim 1, wherein a copolymer corresponding to the composition of the monomeric components has a glass transition temperature higher than −45° C., but no higher than −20° C.

6. The pressure-sensitive adhesive composition according to claim 1, wherein a glass transition temperature of the (meth)acrylic polymer is higher by 8° C. or more than a glass transition temperature of a copolymer corresponding to the composition of the monomeric components excluding the component (B).

7. The pressure-sensitive adhesive composition according to claim 1, wherein the monomeric components are polymerized.

8. The pressure-sensitive adhesive composition according to claim 1, wherein at least some of the monomeric components are partially-polymerized.

9. The pressure-sensitive adhesive composition according to claim 1 further comprising a photopolymerization initiator.

10. A pressure-sensitive adhesive layer comprising a (meth)acrylic polymer, wherein the monomeric components constituting the (meth)acrylic polymer comprises:
- (A) an alkyl acrylate having an alkyl group with 2 to 18 carbons at an ester end;
- (B) an alicyclic monomer;
- (C) a monomer having at least either a hydroxyl group or a carboxyl group;
- (D) one or more polyfunctional monomers each having at least two polymerizable functional groups each with an unsaturated double bond, wherein:

the polyfunctional monomers consist of one or more species of polyfunctional monomers having (meth)acryloyl groups as polymerizable functional groups, if the monomeric components include only one alkyl acrylate (A), then the alkyl group in the alkyl acrylate (A) has 2 to 5 carbons, if the monomeric components include two or more of the alkyl acrylates (A), then the alkyl group in the (A) has an average of less than 7 carbons, where the average is determined as a sum of products of the numbers of carbons of the alkyl groups times the corresponding weight fractions of the respective alkyl acrylates relative to the entire weight of the (A), the monomeric components comprise the (B) at 8% by weight or greater and 55% by weight or less, the monomeric components comprise the (C) at 3% by weight or greater, the (B) and (C) in the monomeric components have a weight % Wb and Wc, respectively, satisfying a relationship $1 \leq Wb/Wc \leq 2.5$, the (A) in the monomeric components have a weight % Wa, and if more than 50% by weight of the (C) is a hydroxyl group-containing monomer, then $0.8 \leq Wa/Wb \leq 2.5$.

11. The pressure-sensitive adhesive layer according to claim 10, wherein the thickness of the pressure-sensitive adhesive layer is 2 μm or greater, but 150 μm or less.

12. The pressure-sensitive adhesive layer according to claim 10, wherein the alkyl acrylate (A) comprises n-butyl acrylate.

13. The pressure-sensitive adhesive layer according to claim 10, wherein the monomeric components comprise the (B) and (C) at 15 to 85% by weight of the total amount of all the monomeric components.

14. The pressure-sensitive adhesive layer according to claim 10, wherein the (C) comprises a monomer having a hydroxyl group.

15. A pressure-sensitive adhesive sheet having the pressure-sensitive adhesive layer according to claim 10 at least on one face of a support.

* * * * *